Feb. 23, 1971   D. M. FRAZIER   3,565,491
JET PUMP METHOD AND SYSTEM
Filed Aug. 20, 1968   2 Sheets-Sheet 1

David M. Frazier
INVENTOR.

BY Stefan M. Stein
ATTORNEY

Feb. 23, 1971      D. M. FRAZIER      3,565,491
JET PUMP METHOD AND SYSTEM
Filed Aug. 20, 1968      2 Sheets-Sheet 2

David M. Frazier
INVENTOR.

BY Stefan M. Stein
ATTORNEY

United States Patent Office 3,565,491
Patented Feb. 23, 1971

3,565,491
JET PUMP METHOD AND SYSTEM
David M. Frazier, 208 Shorecrest, Tampa, Fla. 33609
Filed Aug. 20, 1968, Ser. No. 754,005
Int. Cl. B65g 53/30
U.S. Cl. 302—14
19 Claims

ABSTRACT OF THE DISCLOSURE

A method and system for pumping particulate solids in such application as removing submerged beach sand, and unloading dry solids from a storage container. A jet pump is submerged in the solids and upon application of high pressure primary liquid to the pump, the solids are discharged. To provide an optimum mixture of solids and liquid, a diluting liquid agitates the solids in the vicinity of the pump's intake and an additional diluting liquid is directed to the intake of the pump itself. The velocity, density and/or pressure of the pump's discharge is measured and the diluting liquid is accordingly regulated to provide a proper solid/liquid ratio at a desired discharge velocity.

---

This invention relates to a novel method and system for pumping particulate solids, more particularly a method of and system for pumpng particulate solids in which a proper solid/liquid ratio at a desired discharge velocity is maintained.

Particulate solids, by their very nature, are difficult to pump. One effective way of pumping these solids has been to pump them with a jet pump. Such a pump is shown in U.S. Pat. 3,389,938 issued to D. M. Frazier. As well known, a jet pump pumps solids by emitting a high pressure primary liquid in the form of a jet stream. The jet stream impinges on the solids driving them forward in the form of a slurry and simultaneously, by a vacuum created by the jet stream, draws solids into the intake of the pump.

However, one problem that has limited the application of a jet pump to pumping a bed of particulate solids is a lack of a suitable method and system for controlling the proportions of the solid-liquid slurry of the jet pump's discharge. An accurate and constant control of these proportions is necessary as jet pumps by their inherent nature are limited in the discharge pressure which they can develop. A normal maximum pressure is approximately 120 feet of water. When jet pumps are employed to pump solids, the control of the proportions of the slurry is critical to the height and distance the slurry may be pumped, since a pressure loss in the horizontal pipeline containing a slurry increases at least directly as to the volume of the solids, and in a vertical pipeline directly as to both the volume of the solids and specific gravity of the slurry. Thus as the solids become too dense, the pump's discharge pressure may be insufficient to pump the slurry to its destination. Conversely, if the pump may be able to handle more solids than it is pumping, the optimum capacity of the pump is not being utilized and inefficient pumping occurs. Similarly, the density of the solids in the slurry has a direct effect upon the velocity of the slurry being pumped. If the solids become too dense, the velocity of the slurry may be reduced to the point where the solids will settle out, causing a blockage of the discharge passage. Therefore, it is essential to have a method and system for regulating the solids/liquid ratio at a desired velocity for optimum pump performance.

Another problem that occurs in pumping a bed of particulate solids with a jet pump is that the solids fail to "cave in" in the vicinity of the pump's intake. When this occurs, pumping of the solids ceases until the cavity surrounding the intake of the jet pump is broken down. A means should be provided in the pumping system to remedy this problem.

A system and method which would enable a jet pump to effectively pump a bed of particulate solids could be utilized in a number of applications.

One such application would be in transferring sand to prevent navigable channels from shoaling. Drifting sand shoals navigable channels and basins causing great expense in maintaining them in a navigable condition. A trench placed in the path of the drifting sand would keep the navigable areas from being shoaled, since the drifting sand would fall into the trench before drifting into the navigable areas. The present method and system could then be used to remove the sand from the trench and maintain it at a constant depth. The sand discharged from the trench could be deposited on a lea beach which would normally receive the drifting sand and thereby keep the beach from being eroded.

Another application would be to transfer particulate solids from transportation containers, such as barges. Presently this is done by methods which are time consuming and expensive.

It is an object of this invention to provide a novel method and system for pumping particulate solids with a jet pump.

Another object is to provide a novel method and system for pumping particulate solids with a jet pump wherein the particulate solids are submerged underneath a liquid.

Still another object of the invention is to provide a method and system for agitating and diluting solids in the vicinity of a jet pump's intake.

A further object of this invention is to provide a method and system for diluting the discharge of a jet pump by providing an additional liquid intake to the pump's suction.

A still further object of this invention is to provide a novel method and system for measuring the density of a jet pump's discharge and controlling the proportions of solids in the discharge accordingly for optimum pump performance.

Another object of this invention is to provide a novel method and system for measuring the pressure of a jet pump's discharge and controlling the proportion of solids in the discharge accordingly for optimum pump performance.

Another object is to provide a novel method and system for measuring the velocity of a jet pump's discharge and controlling the proportion of solids in the discharge accordingly for optimum pump performance.

Another object is to provide a novel method and system for measuring the velocity, pressure and density of a jet pump's discharge and controlling the proportion of solids in the discharge in response to the combined measurements for optimum pump performance.

Another object of this invention is to provide a novel method and system for pumping a particulate solid which is both practical and economical to utilize.

Other objects of the invention will inpart be obvious and will in part appear hereinafter.

In accordance with the above objects, a preferred application of the present method and system for pumping a bed of particulate solids submerged beneath water is in the installation and operation of a permanent off-shore pumping facility to prevent shoaling of navigable waters. A succinct summary of the method and system as utilized in this application is as follows.

A trench is suitably constructed in a location to capture drifting sand which would normally fall into navigable waters. Located within the trench at suitable intervals are jet pumps for removing sand falling into the trench and maintaining the trench at a constant depth.

As the sand falls into the trench, the pumps are buried beneath it. When it is desired to remove the sand, the pumps are operated individually and the inoperative pumps are isolated by closing their respective valves. The operating pump receives high pressure primary water from the shore through a common water header and discharges the sand on the beach in a form of a slurry formed when the solids are mixed and driven by the pump's high pressure primary drive water.

Since in this invention the suction of the jet pump is buried in a bed of sand, it is necessary to dilute the sand at the suction of the jet pump in such a manner as to provide the optimum mixture, pipeline velocity, and discharge pressure. To accomplish this desired dilution, three sources of water are available. First there is the source of ocean water which lies above the sand at the location of the jet pump, second there is the source of pressurized water which is provided for agitation of the pump's suction, and third there is the primary drive water of the jet pump itself. By varying any one of these or a combination of them, a controlled dilution is possible.

To determine the amount of dilution required and which dilution source to activate for optimum pumping, the density, pressure and/or velocity of the pump's discharge is measured. Responsive to these measurements, the above three mentioned water diluting sources are controlled by remotely operated valves. For example, if the density of the solids is too high, the valve regulating the water to the agitation nozzle will first be opened to provide dilution at the source of the intake of the pump. If this supply of water is insufficient for proper dilution, the valve controlling the intake of the ocean water to the pump may be opened to provide a further liquid supply. If desired, the primary water supply to the jet pump may also be increased for dilution. In this manner, an optimum mixture of solids to liquid may be constantly measured and maintained.

Another utilization of the method and system for pumping a bed of solids is the removal of solids from a storage container, such as a barge with a common high pressure primary water header and common discharge header leading to an unloading zone. The operation of the system is essentially as described above for pumping submerged sand with the exception that the pumps are usually operated simultaneously rather than individually. The high pressure primary liquid for the jet pumps and dilution water may be obtained by utilizing the water which the barge is floating in.

The invention accordingly comprises the several steps and the relation of one or more such steps with respect to each of the others and the system embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
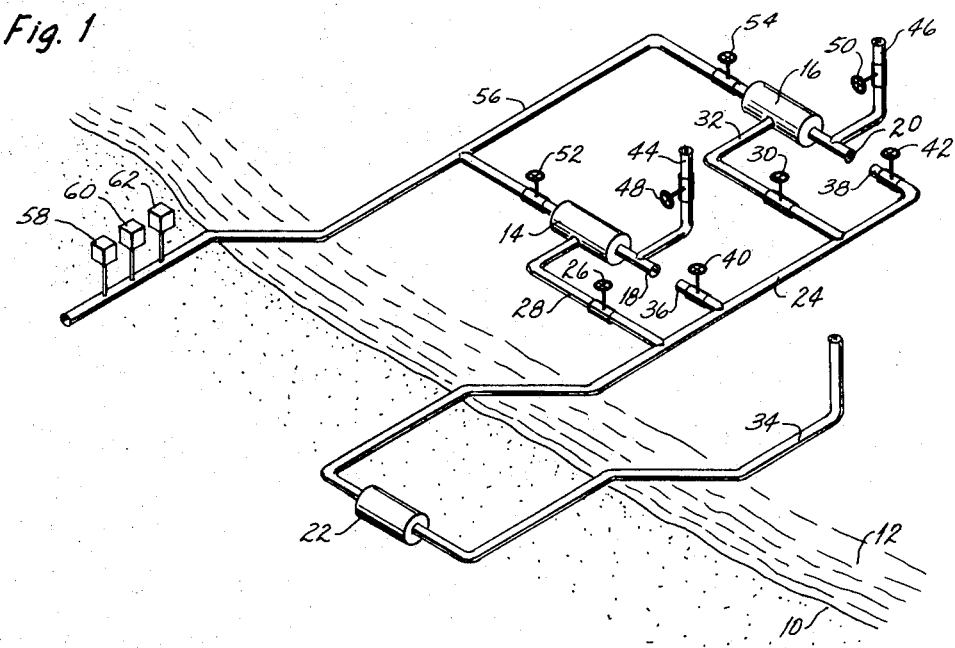
FIG. 1 shows an isometric view of applicant's system for pumping a bed of particulate solids beneath a layer of water.
Figure 2:
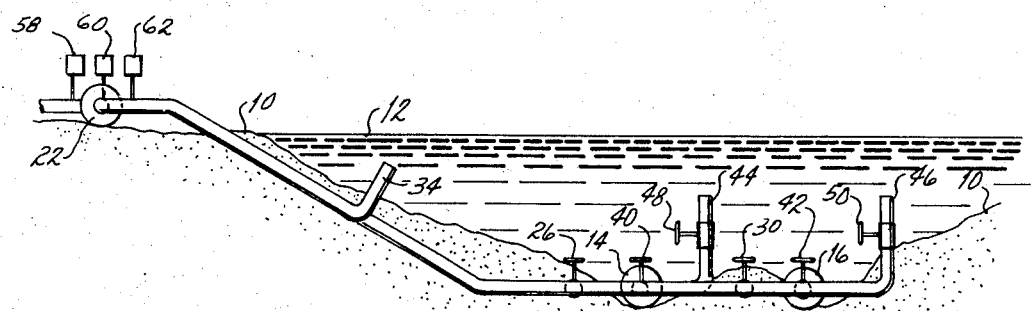
FIG. 2 shows an elevation view of the system shown in FIG. 1 as positioned in a sea trench.

Referring now to the drawings in detail, FIGS. 1 and 2 show a preferred utilization of applicant's novel method and system for pumping particulate solids submerged beneath water. The application is directed to the prevention of navigable waters from being shoaled by providing a trench adjacent the shoaled area and in a path of drifting sand which would normally drift into the navigable waters. The trench prevents navigable waters from being shoaled by capturing the sand before it reaches the navigable water area. The sand is removed from the trench and maintained at a constant depth by utilizing applicant's method and system for pumping a particulate solid submerged beneath water.

FIG. 1 shows an isometric view of the novel system and FIG. 2 shows the elements of the system as positioned when utilized to maintain the trench. The sand is generally designated as 10 in the figures and the water which it is submerged in as 12. Buried beneath the surface of the sand are jet pumps 14 and 16, having a suction 18 and 20 respectively. A delivery pump 22 delivers high pressure primary drive water to a water header 24 and therefrom to jet pump 14 via a remotely controlled regulating valve 26 and a primary water conduit 28; and to jet pump 16 via a remotely controlled regulating valve 30 and primary water conduit 32. The delivery pump is preferably located on shore, and receives water through an inlet 34 from a suitable source not shown. A likely source of water would be the sea water in which the sand is submerged.

Agitating nozzles 36 and 38 are suitably located with respect to jet pumps 14 and 16, such that a stream of water issuing from the respective nozzle agitates and dilutes the sand in the vicinity of the jet pump's suction intake, 18 and 20 respectively. The nozzles receive water from the high pressure primary water header 24 via remotely controlled regulating valves 40 and 42. Communicating with the suction of the jet pumps via standpipes 44 and 46 and remotely controlled regulating valves 48 and 50 is the seawater 12. This source of water is provided as an additional means to dilute the sand being pumped.

The jet pumps discharge the sand in form of slurry through remotely controlled discharge valves 52, 54 respectively into a common discharge conduit or header 56 which carries the slurry to a suitable discharging site, not shown, on the shore. Located on the discharge conduit 56 adjacent the discharging site is a conventional discharge pressure sensing device 58 for measuring the discharge pressure, a conventional discharge velocity sensing device 60 for measuring the flow rate and a conventional discharge density sensing device 62 for measuring the percentage of sand in the slurry being pumped.

The above mentioned remotely controlled valves are preferably electrically operated by conventional means such as an electrically operated solenoid or pilot valve wherein the pilot valve in turn actuates a hydraulic system for opening the valves. It is to be understood that conventional mechanical operating means may also be employed if so desired. The primary water valve, agitating water valve, and standpipe water valve are controlled in response to the measurements of the sensing devices. These valves may be automatically controlled in response to these measurements, which is the preferred method, or manually controlled by an operator monitoring the measurements. A more detailed description of this control is given in the below description of the operation of the pump.

In operation, although all pumps would be operated simultaneously, only one pump is utilized at a time with the remaining pumps being isolated. Operating the pumps individually allows greater control for an optimum mixture of solids being pumped. For illustration, assume that the sand has filled the trench to the extent that pump 16 is to be operated to remove the sand located above it. In preparation for the pump's operation, primary water valve 26, agitating and diluting water valve 40, standpipe water valve 48 and pump discharge valve 52 are closed to isolate jet pump 14. In preparing pump 16, primary water valve 30 and discharge valve 54 of pump 16 are opened; agitating water valve 42 and standby water valve 46 are closed.

Pump 16 begins to pump upon receiving high pressure primary water. It then discharges sand as a slurry through discharge valve 54 into discharge conduit 56 to a suitable discharging point.

As the slurry passes sensing devices 58, 60, 62 the pressure, velocity and density of the pump's discharge is measured respectively. These measurements determine whether water should be added to the slurry or removed for an optimum mixture of solids and liquid. Assuming the sand must be diluted, in a normal sequence the agitating valve 42 is first opened to dilute the solids flowing into the pump. If this source of dilution is inadequate, valve 50 is opened to admit sea water into the pump's intake. If this still isn't adequate, the amount of high pressure primary liquid flowing through the pump may be increased. It is to be understood however that the sources or diluting liquid may be opened in any combination or in other sequences as experimentation and most effective results dictate for the particular particulate solids being pumped. As mentioned previously the preferred method of controlling the diluting water valves is automatically by conventional electrical means in response to measurements of sensing devices 58, 60 and 62.

Should the sensing device for measuring the density of the slurry being pumped indicate a lack of presence of sand, the problem could be that the sand has failed to "cave-in" in the vicinity of the intake of the pump. Agitating regulating valve 40 would then be opened to agitate the sand in the vicinity of the pump causing it to cave-in.

The slurry being pumped may advantageously be spread upon a beach which has previously been eroded, or it may be repumped to another point as desired. After all the sand that will cave to the suction of the pump has caved-in, the pump is flushed by opening valve 50 to prevent the sand from settling in the conduit. After which, the pump is isolated by closing valves 30, 42, 50 and 54. If it is then desirable to remove the sand which has fallen in above pump 14, this pump will then be operated in a manner similar to that described for pump 16. Although only 2 pumps are shown it should be obvious that more may be added as desired.

Figure 3:
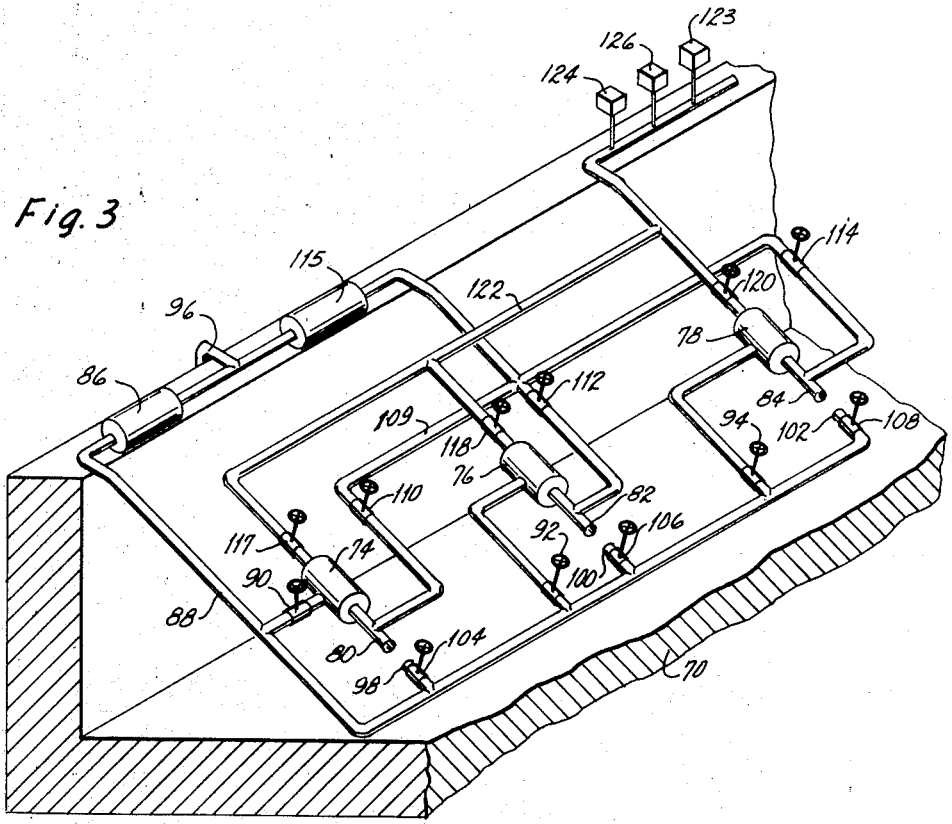
FIG. 3 shows an isometric view of applicant's system for pumping a bed of solids as applied in unloading a barge.
Figure 4:
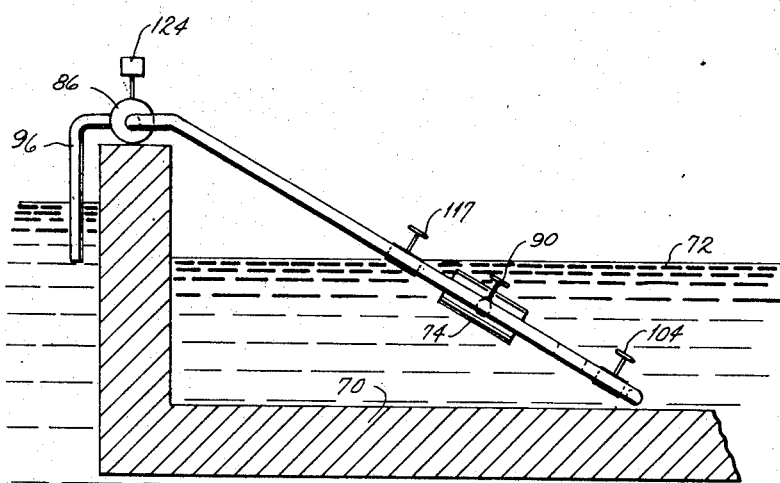
FIG. 4 shows an elevation view of the system shown in FIG. 3.

FIGS. 3 and 4 show applicant's novel method and system for pumping a bed of particulate solids contained in a barge. A cutaway portion of the barge is generally designated as 70 and the top level of particulate solids located within the barge is indicated as 72.

The system is similar as described for the first application. Jet pumps 74, 76 and 78 having suction intakes 80, 82 and 84 are located adjacent the bottom of the barge 70 and are buried within the particulate solids contained within the barge. A delivery pump 86 delivers high pressure primary water to water header 88 and therefrom to the respective jet pumps; to jet pump 74 via remote control regulating valve 90, to jet pump 76 via remotely controlled regulating valve 92 and jet pump 78 via remotely controlled regulating valve 94. The delivery pump 86 preferably receives water through an inlet 96 submerged beneath the water the barge is floating in. Agitating nozzles 98, 100, 102 are suitably located with respect to jet pumps 74, 76 and 78, such that a stream of water rushing from the respective nozzle agitates and dilutes the particulate solids in the vicinity of the jet pump suction intake 80, 82, 84 respectively. The nozzles receive water from the high pressure water header 88 via corresponding remotely controlled regulating valves 104, 106 and 108. Also communicating with the intake suction of the jet pumps 74, 76 and 78 through conduit 109 is a separate source of diluting water controlled by the remotely operated controlled regulating valves 110, 112 and 114. This source of water is provided as an additional dilution means for the particulate solids being pumped and is supplied by pump 115 receiving water from inlet 96 in the sea water the barge is floating in.

The jet pumps discharge the sand in a form of a slurry to the jet pump's associated discharge valves 117, 118 and 120 into a common discharge header 122 which carries the particulate solids to a suitable discharging site. Located on the discharge conduit is a conventional pressure sensing device 124 for measuring the discharge pressure of the jet pump, a conventional discharge velocity sensing device 126 for measuring the flow rate of the jet pump and a conventional density sensing device 128 for measuring the percentage of sand in the slurry being pumped. The valves are preferably electrically operated as previously described for the system used in pumping sand.

The operation of the system is essentially the same as described with the system shown in FIGS. 1 and 2 previously discussed. For this reason, a brief resume and description of the operation will only be given. The preferred method of operation is to operate the pumps as a group, since it is usually desirable to unload a barge as rapidly as possible. For example, assuming all the above mentioned valves in the system are closed, the boat is ready to be unloaded and it is desired to activate the jet pumps; the primary water valves 90, 92 and 94 and discharge valves 117, 118 and 120 are opened. Water pump 86 is activated which discharges high pressure primary drive water to the pumps which commences their operation. The pumps thereupon discharge particulate solids in a form of a slurry into discharge conduit 122 whereupon the slurry is transported to a suitable discharging site not shown. Pressure sensing device 124, velocity sensing device 126 and density sensing device 128 individually or in combination control the primary water valves 90, 92 and 94, agitating valves 104, 106 and 108 and diluting water valves 110, 112 and 114. These valves are either manually or automatically regulated in response to the sensing device. For example, they are opened when there is need for an additional liquid flow through the pump and are closed when the liquid to solid ratio becomes too large. The sequence in which they are opened will be determined by experimentation and observation of the particular particulate solids being pumped.

From the above description, it can easily be seen that applicant's method and system provides an efficient method of pumping particulate solids either beneath the surface of water or stored in a barge. The method and system continuously controls the amount of water mixed with the solids to provide an optimum mixture such that the maximum amount of solids can be pumped.

The method and system is also easily adaptable to be utilized in a number of other applications such as in mining, sand transfer plants, unloading storage bins and the like.

It will thus be seen that the objects set forth above, among those made apparent from the preceding description, are efficiently attained and, since certain changes may be made in carrying out the above method in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A method of pumping particulate solids with a jet pump comprising the steps of passing high pressure primary liquid to said jet pump, agitating said solids with a liquid in the vicinity of the intake of said pump, providing a separate source of diluting liquid in the vicinity of said pump intake and regulating the primary, agitating and diluting liquid to provide a proper mixture of solid and liquid for optimum pumping.

2. A method of claim 1 further comprising the steps of measuring the discharge pressure of said pump, and regulating the diluting liquid in response to said pressure.

3. A method of claim 1 further comprising the steps of measuring the discharge velocity of said pump, and regulating the diluting liquid in response to said velocity.

4. The method of claim 1 further comprising the steps of measuring the density of the discharge of said pump and regulating the diluting liquid in response to said density.

5. The method of claim 4 further comprising the steps of measuring the velocity of the discharge of said pump and regulating the diluting liquid in response to said velocity and density measurements.

6. The method of claim 5 further comprising the step of regulating the primary liquid in response to said measurements.

7. The method of claim 1 further comprising the steps of measuring the discharge pressure of said pump, measuring the discharge velocity of said pump, and measuring the discharge density of said pump, and regulating the diluting liquid in response to said measurements.

8. The method of claim 7 further comprising the step of regulating the primary liquid in response to said measurements.

9. The method of claim 8 wherein the diluting liquid consists of at least two separate sources of liquid, one of which is also used to agitate the particulate solids in the vicinity of the intake of the pump.

10. A system for pumping particulate solids comprising a jet pump, primary liquid delivering means for delivery of high pressure primary liquid to said pump, discharge means for transporting the discharge of said pump to a discharge site, liquid agitating means for agitating solid particles in the vicinity of the intake of said pump, a separate liquid diluting means in the vicinity of said pump and means for regulating the said primary, agitating and diluting means whereby a set mixture of solid particles and liquid is obtained.

11. The system of claim 10 wherein the said liquid agitating means comprises a separate source of water, which is emitted from a nozzle which is so positioned as to agitate the dilute solid particles in the vicinity of the intake of the pump.

12. The system of claim 10 further comprising a pressure sensing device for measuring the pressure of said discharge whereby the volume of the diluting liquid is regulated by said regulating means in response to said measurement.

13. The system of claim 10 further comprising a velocity sensing device for measuring the velocity of said discharge whereby the volume of the diluting liquid is regulated by said regulating means in response to said measurement.

14. The system of claim 10 further including a density sensing device for measuring the density of said discharge whereby the volume of the diluting liquid is regulated by said regulating means in response to said measurement.

15. The system of claim 14 further including a velocity sensing device for measuring the velocity of said discharge whereby the volume of the diluting liquid is regulated by said regulating means in response to said measurement.

16. The system of claim 15 whereby the primary liquid is also regulated by said regulating means in response to said measurement.

17. The system of claim 10 further including a pressure sensing device, a density sensing device, and a velocity sensing device for measuring the pressure, density, and velocity respectively of said discharge means whereby the volume of the diluting liquid is regulated by said regulating means in response to said measurements.

18. The system of claim 17 wherein the volume of the primary liquid is also regulated in response to said measurements.

19. The system of claim 18 wherein the liquid diluting means comprise at least two separate sources of water, one of which is emitted from a nozzle that is so positioned as to agitate and dilute particulate solids in the vicinity of the intake of the pump.

References Cited
UNITED STATES PATENTS

| | | | |
|---|---|---|---|
| 3,329,287 | 7/1967 | Koning | 302—14 |
| 3,389,938 | 6/1968 | Frazier | 302—14 |
| 3,400,984 | 9/1968 | Shellene et al. | 302—14 |
| 3,405,976 | 10/1968 | Anderson et al. | 302—14 |

ANDRES H. NIELSEN, Primary Examiner

U.S. Cl. X.R.

302—15